United States Patent [19]
Allgäuer

[11] Patent Number: 5,127,733
[45] Date of Patent: Jul. 7, 1992

[54] INTEGRATED OPTICAL PRECISION MEASURING DEVICE

[75] Inventor: Michael Allgäuer, Stein, Fed. Rep. of Germany

[73] Assignee: Dr. Johannes Heidenhain GmbH, Traunreut, Fed. Rep. of Germany

[21] Appl. No.: 529,216

[22] Filed: May 25, 1990

[30] Foreign Application Priority Data

Jun. 8, 1989 [DE] Fed. Rep. of Germany ....... 3918726

[51] Int. Cl.$^5$ .............................................. G01B 9/02
[52] U.S. Cl. ................................ 356/356; 356/354; 250/237 G; 385/14
[58] Field of Search ........................ 356/354, 356, 358; 250/237 G; 350/96.12; 385/14

[56] References Cited

U.S. PATENT DOCUMENTS

| | | |
|---|---|---|
| 3,867,035 | 2/1975 | Kaul . |
| 3,900,264 | 8/1975 | Heitmann et al. . |
| 4,286,838 | 9/1981 | Huignard et al. . |
| 4,445,780 | 5/1984 | Burns . |
| 4,629,886 | 12/1986 | Akiyama et al. . |
| 4,672,187 | 6/1987 | Fujita et al. . |
| 4,747,654 | 5/1988 | Yi-Yan . |
| 4,815,850 | 3/1989 | Kanayama et al. ................ 356/356 |
| 4,938,595 | 7/1990 | Parriaux et al. ................ 356/356 |

FOREIGN PATENT DOCUMENTS

| | | |
|---|---|---|
| 0006482 | 6/1979 | European Pat. Off. . |
| 3316144 | 11/1983 | Fed. Rep. of Germany . |
| 3702314 | 1/1988 | Fed. Rep. of Germany ........ 35/356 |
| 3705653 | 7/1989 | Fed. Rep. of Germany ...... 356/358 |
| 0065429 | 4/1982 | France . |
| 59-164914 | 9/1984 | Japan . |
| 225929 | 9/1988 | Japan . |
| 1270875 | 4/1972 | United Kingdom . |
| 2043240 | 3/1979 | United Kingdom . |
| 2146765 | 8/1984 | United Kingdom . |

OTHER PUBLICATIONS

"Method for Forming Novel Curved-Line Gratings and There Use As Reflectors and Resonators in Integrated Optics", Optics Letters, Tien, pp. 64–66, Aug. 1977.

"3×2 Channel Waveguide Gyroscope Couplers: Theory", IEEE Journal of Quantum Electronics, vol. QE-18, No. 10, Oct. 1982.

"Theory of Prism-Film Coupler and Thin-Film Light Guides", J. Optical Soc. of America, vol. 60, (1970), pp. 1325–1337, Tien et al.

*Primary Examiner*—Samuel A. Turner
*Attorney, Agent, or Firm*—Willian Brinks Olds Hofer Gilson & Lione

[57] ABSTRACT

A photoelectric measuring device for measuring the relative position between two objects utilizing interfering lightwave patterns is provided. Two diffraction gratings having an equal grid constants are provided to perpendicularly impinge beam bundles into circular coupling-in gratings of the integrated optical circuit. In addition, an integrated light source may be coupled-out of the integrated optical circuit.

19 Claims, 3 Drawing Sheets

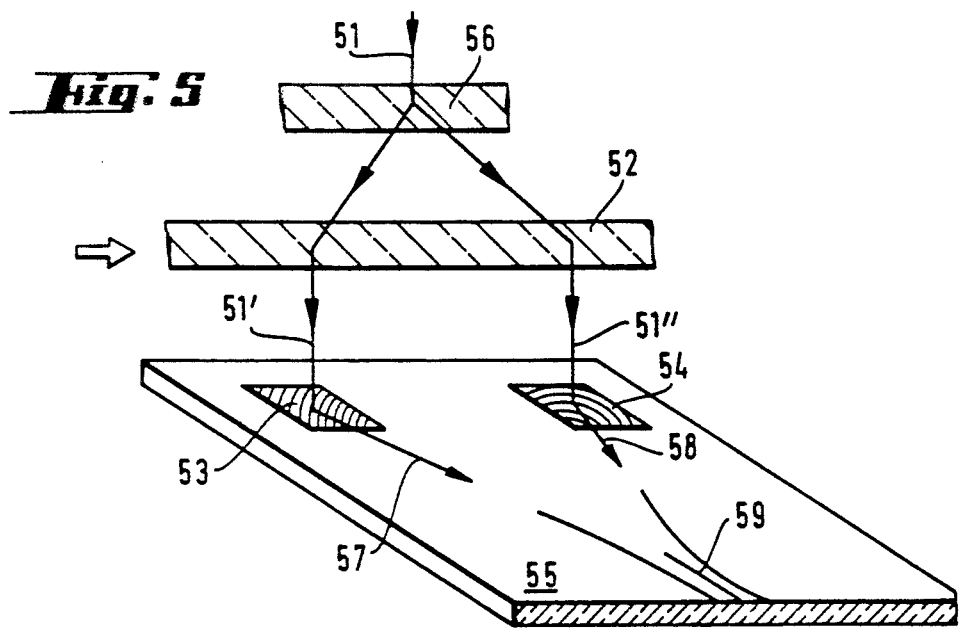
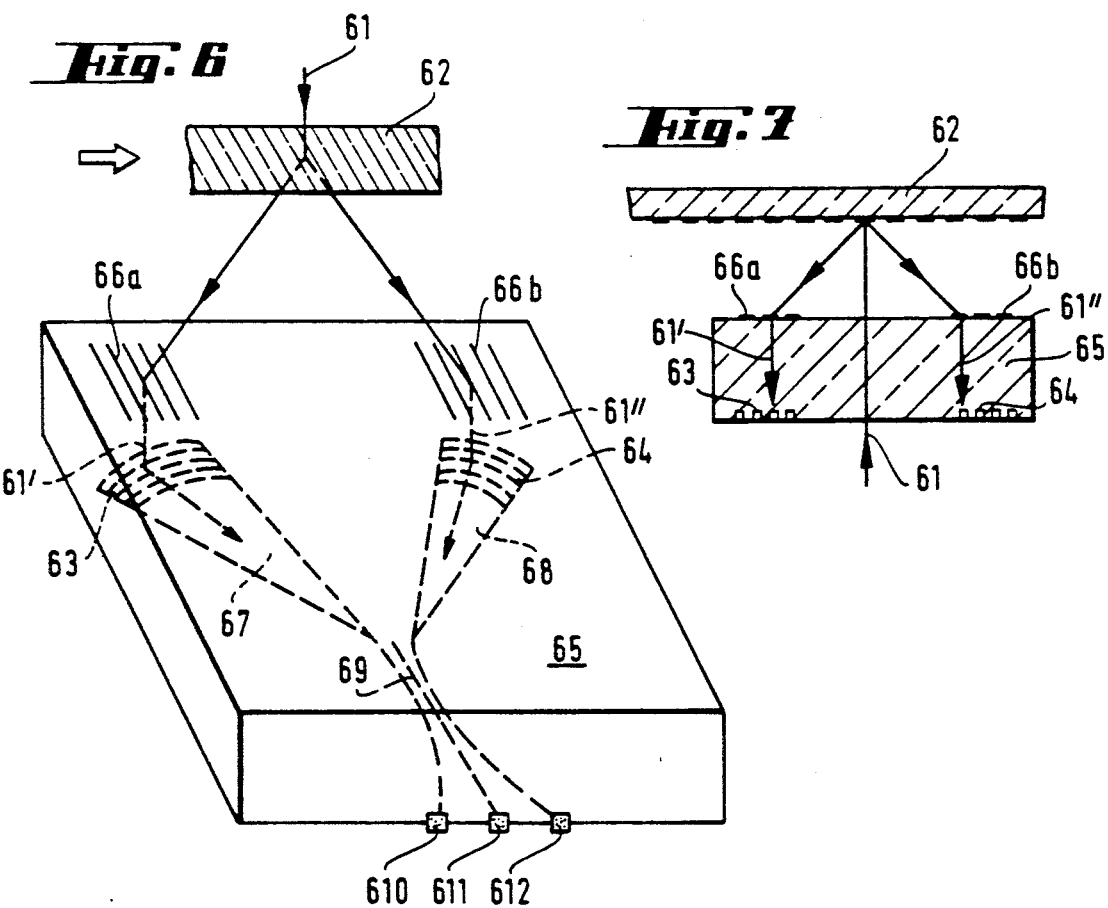

INTEGRATED OPTICAL PRECISION MEASURING DEVICE

BACKGROUND OF THE INVENTION

1. Field of the Invention

The present invention is generally directed to9 a photoelectric measuring system, and more particularly, an apparatus and method for coupling light beams in and out of an integrated optical circuit.

2. Description of the Prior Art

A wide variety of photoelectric measuring devices exist, however, they all suffer from disadvantages the present invention eliminates. Optical displacement measuring systems which are generally known in the art use a diffraction grating which consists of very thin grid lines placed close together on a metal or glass plate.

Typically, available optical displacement measuring devices also comprise a light source which emits monochromatic light, for example a laser light source, and a detector. The light beam from the light source is diffracted by the grating and the two diffracted beams are caused to interfere with each other with the use of a mirror arrangement. The interfered light generates periodically varying measurement signals which are detected by a detector. Such devices are described, for example, in German patent specification DE-OS 33 16 144 and Japanese unexamined patent specification JP-OS 59 164 914.

This type of arrangement suffers from a major disadvantage, namely it requires a trade off between accuracy and the space required by the measuring device. If the device is used in a relatively small space, the relative position of the optical system relative to the diffraction grating is shifted in the direction of the grid lines of the diffraction grating. Thus, a phase change may take place which is similar to the phase change which occurs when relative movement occurs perpendicular to the plane of the diffraction grating. Obviously, this decreases the accuracy of the measurement system.

Alternatively, if the light beam is arranged such that it enters in a substantially vertical manner, the accuracy problem described above is reduced but the space required for the system is increased.

German Patent Application P 36 25 327.8-82 (corresponding to U.S. Pat. application Ser. No. 07/077,190 now U.S. Pat. NO. 4,938,595) describes a position measuring system which is simple in construction and yet avoids undesirable environmental influences on the measuring device so that dependable operation is provided. FIG. 1 illustrates this prior art device. A transmitted light measurement device uses a light source (not shown) and a moveable diffraction grating 2 perpendicularly arranged to the direction of emission from the light source. The light source may be, for example, mounted in the base of a machine tool (not shown) and the diffraction grating 2 may then be, for example, similarly mounted in the cradle of the machine tool (not shown). The relative movement between the base and cradle is measured as machine movement. Thus, this relative movement corresponds to the relative displacement between the light source and the diffraction grating 2.

The beam of the light source is diffracted on the diffraction grating 2 and partial beam bundles, 1' and 1" are created. The partial beam bundles, 1' and 1", fall upon an integrated optical circuit 5. Optical circuit 5 is contained on a substrate in a manner familiar to those who practice in the art. Two coupling means 3 and 4, two beam waveguides (not shown). a coupler (not shown), as well as three detectors (not shown) are components of the integrated optical circuit 5. The coupling-in grids 3 and 4 are in the broadest sense parabolic. While the diffraction grating 2 can be realized with a grid constant between 1.5 $\mu$ to 20 $\mu$, coupling-in grids 3 and 4 have a grid constant on the order of 0.5 $\mu$. Parabolic coupling-in grids having a grid constant of that order are difficult and expensive to construct and produce.

Accordingly, it is a primary object of the present invention to provide a measuring device which utilizes a simple grating structure thus facilitating the construction of the device.

Another object of the present invention is to provide a measuring device that may be economically produced and yet provides a high degree of precision in a small structure.

Further objects and advantages will become apparent from the following description and the accompanying drawings.

SUMMARY OF THE INVENTION

The present invention is directed to an apparatus for coupling light beams with a substrate containing an integrated optical circuit comprising a light emitting source emitting a light beam which is diffracted into at least one diffracted beam bundle. The diffracted beam bundle impinges upon a diffraction means which directs the diffracted beam bundle to perpendicularly impinge upon circular coupling-in gratings.

In a preferred embodiment, integrated light source may also be incorporated into the substrate wherein the light beam is directed perpendicularly out of the substrate by means of a circular coupling-out grating.

The arrangement of the present invention has numerous advantages over prior devices. The use of two diffraction elements having equivalent grid constants allows the diffracted beam bundle to impinge perpendicularly upon circular coupling-in gratings within a small space without losing measurement precision.

The circular coupling-in and coupling-out gratings are easier to produce and more economical than the gratings used in prior devices.

Further advantages will become apparent from the detailed description and the accompanying drawings.

BRIEF DESCRIPTION OF THE DRAWINGS

Further objects and advantages of this invention will become apparent and readily appreciated from the following detailed description of the present invention, taken in conjunction with the accompanying drawings, of which:

FIG. 5 illustrates a photoelectric measuring device in accordance with a second preferred embodiment;

FIG. 6 illustrates a photoelectric measurement device in accordance with a third preferred embodiment;

FIG. 7 illustrates the device shown in FIG. 6 wherein the light source is impinging.

DETAILED DESCRIPTION OF THE PRESENTLY PREFERRED EMBODIMENTS

The preferred embodiments of the present invention will hereinafter be described in detail with reference to the accompanying drawings.

In accordance with the present invention, a displacement measurement device as described herein has been discovered which is compact in design and may be easily integrated with other components. There is provided in accordance with the present invention, an economical and easily constructed displacement measurement device of high measuring precision.

The present invention is directed to a photoelectric displacement measuring device which measures the relative position between two objects utilizing interfering lightwave patterns which provide a high degree of measurement accuracy compared to available measuring devices. Such displacement measuring devices are useful when a high degree of precision is required, for example, when measuring the relative movement between machine parts.

Figure 1:
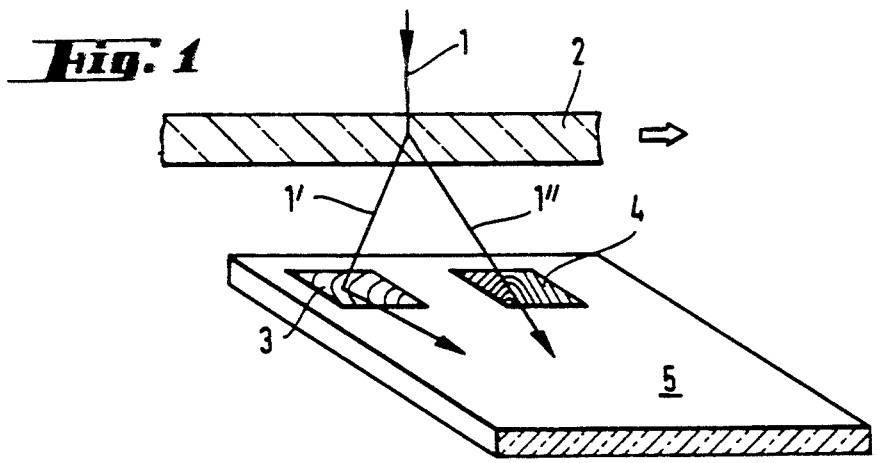
FIG. 1 illustrates a photoelectric measuring device in accordance with the prior art.
Figure 2:
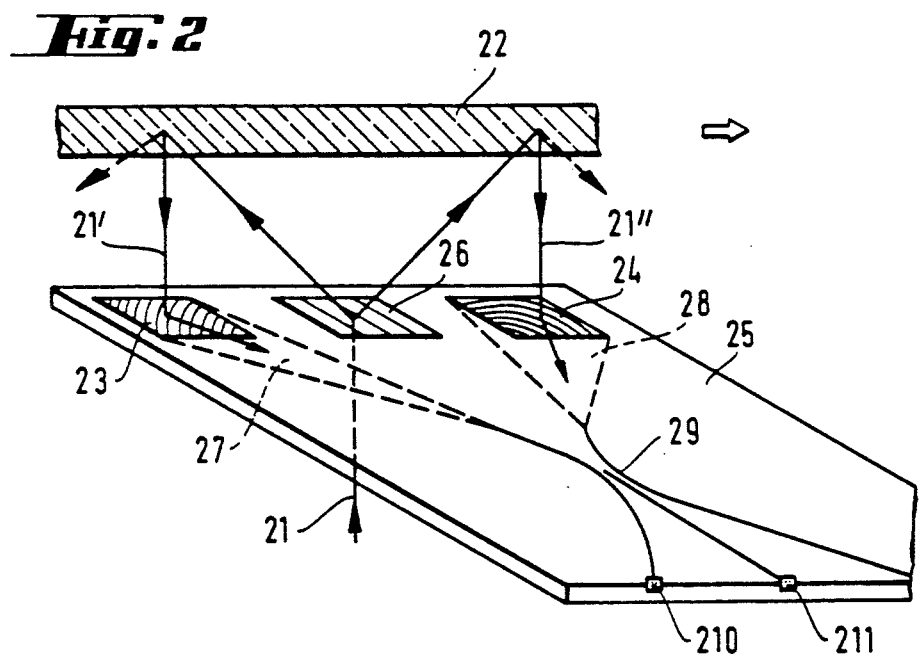
FIG. 2 illustrates a first preferred embodiment of the present invention.

FIG. 2 illustrates a first preferred embodiment of the present invention. An integrated optic circuit 25 is provided on a substrate. A light source (not shown) emits a light beam 21 from underneath the substrate to an integrated first diffraction grating 26. Such a device is referred to as an impinging measurement device.

The first diffraction grating 26 diffracts light beam 21 into two beam bundles 21' and 21". These beam bundles strike a second movable diffraction grating 22 which directs the partial beam bundles 21' and 21" to circular coupling-in gratings 23 and 24. As described above with respect to the prior art device, the light source can be mounted to the base of a machine tool and the movable diffraction grating can be mounted on the cradle of the machine tool, for example. Movable diffraction grating 22 moves in a direction traverse to the axis of the light beam as is indicated by the arrow. Preferably, the diffraction constants of the first diffraction grating 26 and the second diffraction grating 22 are equal, and thus beam bundles 21' and 21" impinge perpendicularly upon circular gratings 23 and 24. The first diffraction grating 26 and the second diffraction grating 22 can have linear or radial gratings. The same is true for all the different embodiments.

Circular coupling-in gratings are easy to construct and produce even for small grid constants of 0.5 $\mu$, unlike the parabolic grids described above with respect to the prior art.

Planar waveguides 27 and 28 then direct the beam bundles 21' and 21" to a coupler 29. The coupler 29 may be a so-called 2×3 coupler which may also be termed a "three-branch junction". The theory of this type of coupler is described in an article by Rolliam K. Burns and A. Fenner Milton: "3×2 Channel Waveguide Gyroscope Couplers: Theory" IEEE Journal of Quantum Electronics, Volume QE-18, No. 10 Oct. 1982, the contents of which is incorporated herein by reference.

The individual components employed may comprise those commonly known in the art. The components of the optical circuit may also comprise fiber optics, the use of which, however, does not necessitate additional exemplary drawings. Those skilled in the art will readily understand and recognize such an arrangement containing corresponding fiber optic components. It is principally known from U.S. Pat. No. 4,286,838 which is incorporated herein by reference, how to transmit light with the aid of coupling grids into waveguides of integrated optical circuits.

The coupled beam bundles 21' and 21" are fed into input areas of coupler 29 through planar waveguides 27 and 28, and are brought into interference in an interference area. The coupler 29 may be constructed such that signals out of phase with each other can be produced at its output area which preferably has three outputs. The signals may be 120° out of phase to each other, but signals may also occur at the two outputs which represent a sine or cosine function whereby a reference signal occurs at the third output. The signals at the outputs are then transmitted to three detectors, two of which are illustrated, 210 and 211. The signals detected are then converted into electric signals and transmitted further to an electronic evaluation circuit (not shown).

The displacements of the second diffraction grating 22 are thus transformed generally into digitally displayed position values which may be used to measure relative machine movement.

Figure 3:
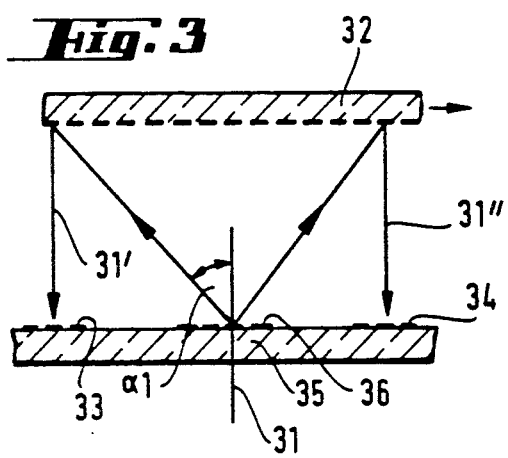
FIG. 3 is a cross section of the first preferred embodiment illustrated in FIG. 2 wherein the diffraction gratings have a first diffraction constant.

FIG. 3 illustrates the measuring arrangement for the embodiment of FIG. 2. Light beam 31 is diffracted by a first diffraction grating 36. The transmitted beams are at an angle $\alpha 1$ from the normal and strike a second movable diffraction grating 32. The beam bundles 31' and 31" strike circular coupling-in gratings 33 and 34 perpendicularly. In order for the beam bundles 31' and 31" to strike gratings 33 and 34 perpendicularly, the grid constants of the first diffraction grating 36 and the second diffraction grating 32 must be equal. Through the selection of a particular grid constant, the deflection angle $\alpha 1$ can be determined, and thus the spacing of the gratings from one another can also be determined.

Figure 4:
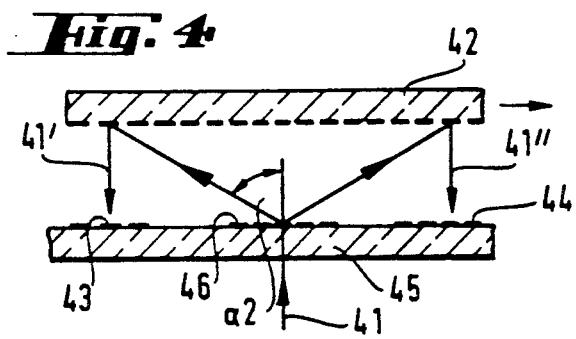
FIG. 4 illustrate a cross section of the first preferred embodiment illustrated in FIG. 2 wherein the diffraction gratings have a second diffraction constant.

FIG. 4 illustrates a measuring arrangement similar to FIG. 3 except that the grid constant of the first diffraction grating 46 and the second diffraction grating 42 are different than the grid constant illustrated in FIG. 3. Again through the choice of a particular grid constant, the deflection angle $\alpha 2$ can be determined and thus the spacing of the gratings from one another. The present invention can, therefore, accommodate various space limitation by correctly choosing the value of the grid constants.

FIG. 5 illustrates a second preferred embodiment of the present invention. Specifically, the first diffraction grating 56 is an unintegrated component of optical circuit 55. Both the first diffraction grating 56 and the second movable diffraction grating 52 are constructed as transmitted light gratings with equal grid constant.

Vertically incident beam bundles 51' and 51" impinge perpendicularly upon circular coupling-in gratings 53 and 54 which guide the beam bundles through planar waveguides 57 and 58 to coupler 59 as described above with respect to FIG. 2.

FIG. 6 illustrates a third preferred embodiment of the present invention. A light beam 61 is diffracted by a first movable diffraction grating 62 such that two symmetrical beam bundles 61' and 61" impinge upon second diffraction gratings 66a and 66b, which again have the same grid constant as the first diffraction grating 62. The two diffraction gratings 66a and 66b are integrated components of an integrated optical circuit 65 housed in a substrate. Gratings 66a and 66b are disposed on the upper surface of the substrate facing the first diffraction grating 62. On the second diffraction gratings 66a and 66b, the beam bundles 61' and 61" are diffracted in such a way that they impinge perpendicularly upon two circular coupling-in gratings, 63 and 64. Coupling-in gratings 63 and 64 are disposed on the bottom surface of the substrate. Also provided on the bottom surface of the substrate are lightwave guides 67 and 68, as well as a coupler 69 and three detectors 610, 611 and 612.

FIG. 7 depicts the measurement device shown in FIG. 6 wherein the light beam 61 is lead through the substrate of the integrated optical circuit 65 and diffracted by the first movable diffraction grating 62 such that the two beam bundles impinge upon the second diffraction gratings 66a and 66b as described with reference to FIG. 6. FIG. 7 clearly illustrates that the second diffraction gratings 66a and 66b lie on opposite surfaces of the substrate from circular coupling-in gratings 63 and 64.

Figure 8:
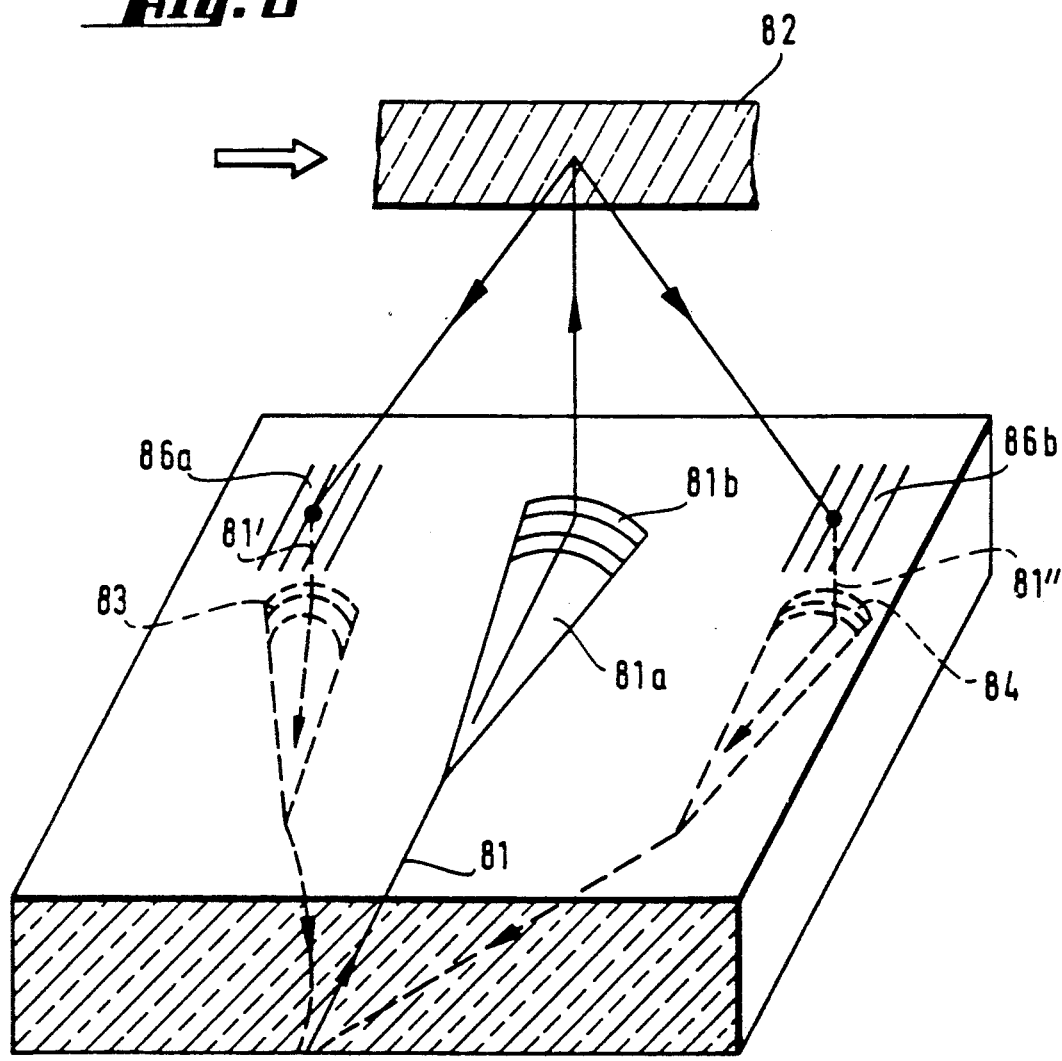
FIG. 8 illustrate a fourth preferred embodiment in accordance with the present invention.

FIG. 8 illustrates a fourth preferred embodiment of the present invention wherein the light source (not shown) is an integrated component of the integrated optical circuit 85. Preferably, the light beam 81 is fed by means of a light wave guide 81a into a circular coupling-out grating 81b. Analogously to the circular coupling-in grating explain with reference to the previous drawings, the circular coupling-out grating 81b is constructed so that the light beam 81 perpendicularly coupled-out impinges upon a first movable diffraction grating 82 and is there diffracted. The diffracted beam bundles 81' and 81" impinge upon the second diffraction gratings 86 and 86a on which they are again diffracted. The diffraction gratings 86 and 86a are integrated components of the optical circuit 85. Circular coupling-in gratings 83 and 84 are located on the bottom surface of the substrate as described with reference to FIG. 6.

As previously described, phase displaced electrical signals are then recovered.

While this invention has been shown and described in connection with preferred embodiments, it is apparent that certain changes and modifications, in addition to those mentioned above, may be made from the basic features of the present invention. Accordingly, it is intended that the scope of the invention be defined by the following claims, including all equivalents.

I claim:

1. Apparatus for coupling light beams with a substrate containing an integrated optical circuit comprising:
   a light emitting source;
   a diffraction element for diffracting light from said light emission source into at least one diffracted beam bundle;
   a coupling element having circular gratings; and
   diffraction means for directing said diffracted beam bundle to said coupling element so that said diffracted beam bundle impinges perpendicularly upon said coupling element wherein said diffraction element and said diffraction means have an equivalent grid constant.

2. Apparatus according to claim 1 wherein said diffraction means is movable.

3. Apparatus according to claim 1 wherein said diffraction element is movable.

4. Apparatus according to claim 1 wherein said light emitting source comprises an integrated component of said optical circuit.

5. Apparatus according to claim 1 wherein said diffraction element comprises an integrated component of said optical circuit.

6. Apparatus according to claim 1 wherein said diffraction means comprises an integrated component of said optical circuit.

7. Apparatus according to claim 1 wherein said diffraction element and diffraction means are constructed as linear gratings.

8. Apparatus according to claim 1 wherein said diffraction element and said diffraction means are constructed as radial gratings.

9. Apparatus according to claim 1 further comprising:
   waveguide means for directing beam bundles from said coupling element;
   coupling means disposed to receive said beam bundles directed by said waveguide means for bringing said beam bundles into interference; and
   detection means for detecting phase displaced electrical signals from said coupling means.

10. Apparatus according to claim 9 wherein said coupling means is a 2×3 coupler.

11. Apparatus according to claim 1 wherein said substrate comprises a top surface and a bottom surface and said diffraction element is disposed on said top surface and said coupling element is disposed on said bottom surface.

12. Apparatus according to claim 11 wherein said light emitting source comprises an integrated component of said optical circuit.

13. Apparatus according to claim 12 further comprising a second coupling element wherein said light emitting source impinges perpendicularly upon said diffraction element.

14. Apparatus according to claim 13 wherein said second coupling element has circular gratings.

15. Apparatus according to claim 9 wherein said detection means comprises an integrated component of said integrated circuit.

16. Apparatus for coupling light beams with a substrate containing an integrated optical circuit comprising:
   a light emitting source creating a light beam;
   diffraction means for diffracting said light beam;
   means for perpendicularly impinging said light beam onto said diffraction means;
   a coupler comprising circular gratings; and
   means for perpendicularly impinging said diffracted beam onto said coupler comprising a diffraction element having an equivalent grid constant to said diffraction means.

17. Apparatus according to claim 16 wherein said light emitting source comprises an integrated component of said optical circuit.

18. Apparatus according to claim 16 wherein said means for perpendicularly impinging said light beam onto said diffraction means comprises a circular coupling-out grating.

19. Apparatus for coupling light beams with a substrate containing an integrated optical circuit comprising:
   a light emitting source;
   a diffraction element for diffracting light from said light emission source into at least one diffracted beam bundle;
   a coupling element having circular gratings located on said substrate; and
   diffraction means located on said substrate for directing said diffracted beam bundle to said coupling element so that said diffracted beam bundle impinges perpendicularly upon said coupling element wherein said diffraction element and said diffraction means have equivalent grid constants.

* * * * *

UNITED STATES PATENT AND TRADEMARK OFFICE
CERTIFICATE OF CORRECTION

PATENT NO. : 5,127,733
DATED : July 7, 1992
INVENTOR(S) : Michael Allgäuer

It is certified that error appears in the above-indentified patent and that said Letters Patent is hereby corrected as shown below:

Column 1, line 7, please delete "to9" and substitute therefor --to--.

Column 2, line 2, after "(not shown)" please delete ".". and insert --,--.

Signed and Sealed this

Twelfth Day of July, 1994

BRUCE LEHMAN

Attest:

*Attesting Officer*          *Commissioner of Patents and Trademarks*